United States Patent
Ota et al.

(10) Patent No.: US 6,189,332 B1
(45) Date of Patent: Feb. 20, 2001

(54) AIR CONDITIONER AND ITS MANUFACTURING METHOD

(75) Inventors: Masaharu Ota, Shiga; Shiho Furuya, Kyoto; Kiyoshi Kinoshita, Shiga, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 09/217,045

(22) Filed: Dec. 21, 1998

(30) Foreign Application Priority Data

Dec. 22, 1997 (JP) .................................................... 9-352628

(51) Int. Cl.$^7$ ...................................................... F25D 17/04
(52) U.S. Cl. .......................................... 62/407; 416/241 A
(58) Field of Search ............................. 62/407, 426, 298; 416/230, 241 A; 264/567

(56) References Cited

U.S. PATENT DOCUMENTS 5,096,384 * 3/1992 Immell et al. .................... 416/229 R
5,213,476 * 5/1993 Monroe ................................ 416/230

FOREIGN PATENT DOCUMENTS 56-41105  9/1981 (JP) .

* cited by examiner

Primary Examiner—William Doerrler
Assistant Examiner—Melvin Jones
(74) Attorney, Agent, or Firm—Ratner & Prestia (57) ABSTRACT

The invention includes a step of supplying at least one heat control means of heating means and cooling means for conditioning the air temperature, and a step of manufacturing a fan for blowing air controlled by the heat control means, in which the step of manufacturing the fan includes a step of preparing a compound material having (i) glass fiber, and (ii) at least one copolymer of a copolymer produced from a monomer containing acrylonitrile and styrene, and a copolymer produced from styrene and a heat resistant monomer, a step of forming a molded part by molding the compound material, a step of assembling a fan by using the molded part, and a step of clearing the molded part of strain by annealing the fan by hot air circulation in a temperature range lower by about 5° C. to about 20° C. than the load deflection temperature, and in a wind velocity range of about 1 m/sec to about 3 m/sec. The fan having a load deflection temperature of about 100° C. or more by a testing method of JIS K 7207 at a load of 18.5 kgf/cm$^2$. The air conditioner is manufactured in this manner. In this constitution, the required annealing time is shortened, and the productivity is enhanced. Moreover, the flowability of the compound material is heightened, so that the molding performance is improved.

35 Claims, 3 Drawing Sheets

AIR CONDITIONER AND ITS MANUFACTURING METHOD

FIELD OF THE INVENTION

The present invention relates to an air conditioner, more particularly to a fan used in the air conditioner and its manufacturing method.

BACKGROUND OF THE INVENTION

A fan conventionally used in an air conditioner is disclosed, for example, in Japanese Laid-open Utility Model No. 54-20004. This Japanese Laid-open Utility Model No. 54-20004 relates to a fan integrally forming blades and an end plate, and this fan is formed of a mixture of acrylonitrile styrene resin (AS resin), and about 20 wt. % to about 40 wt. % of glass fiber (GF). The mechanical strength is improved by mixing glass fiber. Generally, the synthetic resin end plate and blades are integrally bonded by ultrasonic fusion, and then molding strain and strain by ultrasonic fusion are removed by annealing treatment by circulation of hot air of about 80 to 95° C. in a hot air circulating oven or the like. By such treatment, the heat and creep resistance is enhanced as the fan in actual use.

Annealing is a treatment for removing strain. However, in the constitution of such conventional fan, in order to enhance the mechanical strength of the molding, the annealing treatment for removing fusion strain or molding strain after processing by ultrasonic fusion of end plate and blades by mixing about 20 to 40 wt. % of GF in the AS resin as synthetic resin material is done in an ordinary annealing oven having a temperature difference of 5° C. or more between the top and bottom of the fan, and the circulation of hot air is at wind velocity of 0.5 m/sec or less. Hence, it required a long time in annealing the entire fan uniformly. This method was therefore inferior in productivity and processability. Moreover, such synthetic resin material is inferior in flowability, short shots are likely to occur when molding, and, as a result, the yield and productivity were inferior.

It is hence an object of the invention to present a fan free from fusion strain and molding strain, and excellent in molding performance, rigidity, impact resistance, heat and creep resistance, and productivity.

SUMMARY OF THE INVENTION

The air conditioner of the invention comprises:
(a) at least one heat control means of heating means and cooling means for conditioning an air temperature, and
(b) a fan for blowing air controlled by the heat control means,
in which the fan includes a molded part molded of a compound material having:
  (i) glass fiber, and
  (ii) at least one copolymer of a copolymer produced from a monomer containing acrylonitrile and styrene, and a copolymer produced from styrene and a heat resistant monomer,
the molded part has a load deflection temperature of about 100° C. or more by a testing method of JIS K 7207 at a load of 18.5 kgf/cm$^2$, and the fan is cleared of strain by annealing treatment by hot air circulation in a temperature range lower by about 5° C. to about 20° C. than the load deflection temperature, and in a wind velocity range of about 1 m/sec to about 3 m/sec.

The manufacturing method of an air conditioner of the invention comprises:

(a) a step of supplying at least one heat control means of heating means and cooling means for conditioning the air temperature, and
(b) a step of manufacturing a fan for blowing air controlled by the heat control means,
in which the step of manufacturing the fan includes:
  (1) a step of preparing a compound material having
    (i) glass fiber, and
    (ii) at least one copolymer of a copolymer produced from a monomer containing acrylonitrile and styrene, and a copolymer produced from styrene and a heat resistant monomer,
  (2) a step of forming a molded part by molding the compound material,
  (3) a step of assembling a fan by using the molded part, the fan having a load deflection temperature of about 100° C. or more by a testing method of JIS K 7207 at a load of 18.5 kgf/cm$^2$, and
  (4) a step of clearing the molded part of strain by annealing the fan by hot air circulation in a temperature range lower by about 5° C. to about 20° C. than the load deflection temperature, and in a wind velocity range of about 1 m/sec to about 3 m/sec.

Preferably, in the manufacturing method of air conditioner, when the fan is treated by the annealing, the difference between maximum temperature and minimum temperature of surface temperature of the fan is within about 5° C.

Preferably, the compound material comprises 50 wt. % to 80 wt. % of the copolymer, and 20 wt. % to 50 wt. % of glass fiber dispersed in the copolymer.

Preferably, the compound material has a copolymer produced from a monomer containing acrylonitrile and styrene, and the glass fiber, and the fan is annealed in a temperature range of about 80° C. to about 100° C.

Preferably, the compound material has a copolymer produced from a monomer containing styrene and heat resistant monomer, and the glass fiber, and the fan is annealed in a temperature range of about 80° C. to about 105° C.

Preferably, the fan includes end plates disposed at both ends, a partition board placed between the end plates, and plural blades having weld zones fused to at least one of the end plates and partition board, and strain of the weld zones is removed.

Preferably, the fan has a nearly cylindrical appearance, at least one of the end plates and the partition board has a disk shape, and is rotatable about the axis linking with the center of the disk shape, and wind is generated by the rotation about the axis and action of the blades.

Preferably, the step of annealing includes:
(c) a step of supplying an annealing oven for circulating hot air, comprising a panel heater installed nearly parallel to a side wall, an agitation fan installed above the panel heater, and a sample stand placed in the blowing direction of the agitation fan, and
(d) a step of clearing the fan of strain by blowing hot air to the fan uniformly by placing the fan on the sample stand.

In this constitution,. by annealing the fan made of synthetic resin after molding process by circulating hot air at wind velocity of 1 to 3 m/sec, annealing is done in a shorter time than in the conventional annealing treatment by hot air circulation at wind velocity of 0.5 m/sec or less, and hence the productivity is enhanced. When this fan is used in the air conditioner, deformation does not occur during use of the fan. Moreover, a fan having an excellent heat and creep resistance is obtained. Moreover, when using a copolymer produced from styrene and heat resistant monomer, the flowability of the compound material in molding is improved, and the molding performance is enhanced, and adjustment of the molding machine is easier. Still more, occurrence of short shots in molding is decreased, the yield is increased, so that the productivity is significantly enhanced.

REFERENCE NUMERALS

1 Cross flow fan (fan)
2 End plate (fan member)
3 Partition board (fan member)
4 Blade (fan member)
5 Synthetic resin material
6 Heater unit
7 Agitation fan
8 Fan hood
9 Hot air circulation annealing oven

DETAILED DESCRIPTION OF THE INVENTION

The air conditioner of the invention comprises:
(a) at least one heat control means of heating means and cooling means for conditioning the air temperature, and
(b) a fan for blowing air controlled by the heat control means,
in which the fan includes a molded part molded of a compound material having:
(i) glass fiber, and
(ii) at least one copolymer of a copolymer produced from a monomer containing acrylonitrile and styrene, and a copolymer produced from styrene and a heat resistant monomer,
the molded part has a load deflection temperature of about 100° C. or more by a testing method of JIS K 7207 at a load of 18.5 kgf/cm², and the fan is cleared of strain by annealing treatment by hot air circulation in a temperature range lower by about 5° C. to about 20° C. than the load deflection temperature, and in a wind velocity range of about 1 m/sec to about 3 m/sec.

The manufacturing method of an air conditioner of the invention comprises:
(a) a step of supplying at least one heat control means of heating means and cooling means for conditioning the air temperature, and
(b) a step of manufacturing a fan for blowing air controlled by the heat control means,
in which the step of manufacturing the fan includes:
(1) a step of preparing a compound material having
   (i) glass fiber, and
   (ii) at least one copolymer of a copolymer produced from a monomer containing acrylonitrile and styrene, and a copolymer produced from styrene and a heat resistant monomer,
(2) a step of forming a molded part by molding the compound material,
(3) a step of assembling a fan by using the molded part, the fan having a load deflection temperature of about 100° C. or more by a testing method of JIS K 7207 at a load of 18.5 kgf/cm², and
(4) a step of clearing the molded part of strain by annealing the fan by hot air circulation in a temperature range lower by about 5° C. to about 20° C. than the load deflection temperature, and in a wind velocity range of about 1 m/sec to about 3 m/sec.

Preferably, when the fan is treated by the annealing, the difference between maximum temperature and minimum temperature of surface temperature of the fan is within about 5° C.

In this constitution, annealing is treated in a short time, and the productivity is enhanced. Moreover, since the fan of the invention is excellent in rigidity and heat and creep resistance, thermal deformation of the fan can be prevented during use of the air conditioner for a long period. If the load deflection temperature is less than 100° C., the heat resisting temperature of the fan is low, and hence the fan cannot be used in the air conditioner. If the annealing temperature is higher than the value of subtracting 5° C. from the load deflection temperature, the fan is deformed. If the annealing temperature is lower than the value of subtracting 20° C. from the load deflection temperature, strain of the fan can be hardly removed. If the wind velocity is less than 1 m/sec, strain of the fan can be hardly removed. If the wind velocity exceed 3 m/sec, the fan is likely to be deformed.

The air conditioner of the invention comprises:
(a) at least one heat control means of heating means and cooling means for conditioning the air temperature, and
(b) a fan for blowing air controlled by the heat control means,
in which the fan includes a molded part molded of a first compound material having 50 wt. % to 80 wt. % of a copolymer produced from a monomer containing acrylonitrile and styrene, and 20 wt. % to 50 wt. % of glass fiber dispersed in the copolymer, and the fan is cleared of strain by annealing treatment by hot air circulation in a temperature range of about 80° C. to about 100° C., and in a wind velocity range of about 1 m/sec to about 3 m/sec.

The manufacturing method of an air conditioner of the invention comprises:
(a) a step of supplying at least one heat control means of heating means and cooling means for conditioning the air temperature, and
(b) a step of manufacturing a fan for blowing air controlled by the heat control means,
in which the step of manufacturing the fan includes:
(1) a step of preparing a compound material having
   (i) glass fiber, and
   (ii) a copolymer produced from a monomer containing acrylonitrile and styrene,
(2) a step of forming a molded part by molding the compound material,
(3) a step of heating and fusing the molded part for assembling a fan having weld zone, and
(4) a step of clearing the weld zone of strain by annealing the fan by hot air circulation in a temperature range of about 80° C. to about 100° C., and in a wind velocity range of about 1 m/sec to about 3 m/sec.

The molded part has a load deflection temperature of about 100° C. or more by a testing method of JIS K 7207 at a load of 18.5 kgf/cm².

The fan includes end plates disposed at both ends, a partition board placed between the end plates, and plural blades having weld zones fused to at least one of the end plates and partition board, and strain of the weld zones is removed.

The fan has a nearly cylindrical appearance, at least one of the end plates and the partition board has a disk shape, and is rotatable about the axis linking with the center of the disk shape, and wind is generated by the rotation about the axis and action of the blades.

When the fan is treated by the annealing, the difference between maximum temperature and minimum temperature of surface temperature of the fan is within about 5° C.

In this constitution, in particular, the annealing temperature is preferred to be about 90° C. to about 100° C. In this case, as compared with the conventional method and the conventional air conditioner manufactured by such method by annealing the fan made of compound material composed of a copolymer produced from a monomer containing acrylonitrile and styrene and 30 wt. % of glass fiber, by hot air circulation at wind velocity of 0.5 m/sec or less, the air conditioner according to the method of the invention is annealed in a short time, and the productivity is enhanced. Moreover, since the fan of the invention is excellent in rigidity and heat and creep resistance, thermal deformation of the fan can be prevented during use of the air conditioner for a long period. If the load deflection temperature is less than 100° C., the heat resisting temperature of the fan is low, and hence the fan cannot be used in the air conditioner. If the annealing temperature is more than 100° C., the fan is likely to be deformed. If the annealing temperature is less than 80° C., strain of the fan can be hardly removed. If the wind velocity is less than 1 m/sec, strain of the fan can be hardly removed. If the wind velocity exceed 3 m/sec, the fan is likely to be deformed.

Other air conditioner of the invention comprises:
- (a) at least one heat control means of heating means and cooling means for conditioning the air temperature, and
- (b) a fan for blowing air controlled by the heat control means,
- in which the fan includes a molded part molded of a first compound material having 50 wt. % to 80 wt. % of a copolymer produced from styrene and heat resistant monomer, and 20 wt. % to 50 wt. % of glass fiber dispersed in the copolymer, and the fan is cleared of strain by annealing treatment by hot air circulation in a temperature range of about 80° C. to about 105° C., and in a wind velocity range of about 1 m/sec to about 3 m/sec.

Other manufacturing method of an air conditioner of the invention comprises:
- (a) a step of supplying at least one heat control means of heating means and cooling means for conditioning the air temperature, and
- (b) a step of manufacturing a fan for blowing air controlled by the heat control means,
- in which the step of manufacturing the fan includes:
  - (1) a step of preparing a compound material having
    - (i) glass fiber, and
    - (ii) a copolymer produced from styrene and a heat resistant monomer,
  - (2) a step of forming a molded part by molding the compound material,
  - (3) a step of heating and fusing the molded part for assembling a fan having weld zone, and
  - (4) a step of clearing the weld zone of strain by annealing the fan by hot air circulation in a temperature range of about 80° C. to about 105° C., and in a wind velocity range of about 1 m/sec to about 3 m/sec.

The molded part has a load deflection temperature of about 105° C. or more by a testing method of JIS K 7207 at a load of 18.5 kgf/cm².

The fan includes end plates disposed at both ends, a partition board placed between the end plates, and plural blades having weld zones fused to at least one of the end plates and partition board, and strain of the weld zones is removed.

The fan has a nearly cylindrical appearance, at least one of the end plates and the partition board has a disk shape, and is rotatable about the axis linking with the center of the disk shape, and wind is generated by the rotation about the axis and action of the blades.

When the fan is treated by the annealing, the difference between maximum temperature and minimum temperature of surface temperature of the fan is within about 5° C.

The heat resistant monomer is at least one monomer selected from the group consisting of monomer containing maleic group, monomer containing N-phenyl maleimide group, and monomer containing methacrylic group.

In this constitution, the compound material used in the method of the invention is improved in the flowability by two or three times as compared with the conventional compound material comprising the conventional copolymer produced from a monomer of acrylonitrile and styrene and 30 wt. % of glass fiber. Moreover, the fan used in the air conditioner of the invention has excellent heat resistance, rigidity, and impact resistance. Further, occurrence of short shots is decreased when molding the end plates or partition board. In particular, when molding thin-wall blades, occurrence of short shots is extremely decreased. In one molding process, moreover, a plurality-molding die capable of molding two to four multiple molded parts can be used, and plural molded parts can be molded stably and simultaneously. As a result, the yield is improved and the productivity is further enhanced.

After assembling the fan by integrally joining the end plates, partition board and blades obtained by molding by ultrasonic fusion or the like, by annealing the obtained assembled fan by hot air circulation in a range of about 80° C. to about 105° C., preferably about 90° C. to 105° C., at wind velocity of 1 to 3 m/sec, as compared with the conventional annealing treatment by hot air circulation at wind velocity of 0.5 m/sec or less, the annealing treatment is finished in a shorter time, and strain of molded part and strain of junction can be prevented. Thus, the productivity is extremely enhanced. When this fan is used in the air conditioner, thermal deformation of the fan in a long period of use is prevented, and the long-term reliability is extremely enhanced.

If the load deflection temperature is less than 100° C., the heat resisting temperature of the fan is low, and hence the fan cannot be used in the air conditioner. If the annealing temperature is more than 100° C., the fan is likely to be deformed. If the annealing temperature is less than 80° C., strain of the fan can be hardly removed. If the wind velocity is less than 1 m/sec, strain of the fan can be hardly removed. If the wind velocity exceed 3 m/sec, the fan is likely to be deformed.

A different manufacturing method of an air conditioner of the invention comprises:

(a) a step of supplying at least one heat control means of heating means and cooling means for conditioning the air temperature, and (b) a step of manufacturing a fan for blowing air controlled by the heat control means, in which the step of manufacturing a fan includes:

(1) a step of molding a polymer for producing plural molded parts, (2) a step of heating and fusing each molded part of the plural molded parts for assembling a fan having weld zone, and (4) a step of annealing the fan by hot air circulation to clear the weld zone of strain, and the step of annealing includes:

(c) a step of supplying an annealing oven for circulating hot air, comprising a panel heater installed nearly parallel to a side wall, an agitation fan installed above the panel heater, and a sample stand placed in the blowing direction of the agitation fan, and (d) a step of clearing the fan of strain by blowing hot air to the fan uniformly by placing the fan on the sample stand.

The panel heater has two mutually confronting panel heaters, the hot air enters from the lower side of the two panel heaters, and moves to the upper side through the space between the two panel heaters, the hot air moving to the upper side is agitated by the agitation fan to hit against the fan placed on the sample stand, and the hot air hitting against the fan enters between the two panel heaters from the lower side of the two panel heaters.

The annealing oven has a fan hood for separating the sample stand and the panel heaters, and the hot air circulated by the agitation fan hits against the fan through the fan hood.

When the fan is treated by the annealing, the difference between maximum temperature and minimum temperature of surface temperature of the fan is within about 5° C.

In this constitution, by annealing treatment by the hot air circulation by using the agitation fan and fan hood provided in the upper part of the hot air circulation oven, hot air of uniform temperature and controlled wind velocity is blown uniformly to the entire assembled molded part. Moreover, by using the panel heater as the heater unit provided in the oven side, the circulation air can be heated uniformly. Accordingly, the temperature around the assembled molded part is uniform, and uniform heating is realized, so that a secure annealing effect is obtained in a short time.

Embodiments of the invention are described below while referring to the accompanying drawings.

Figure 1:
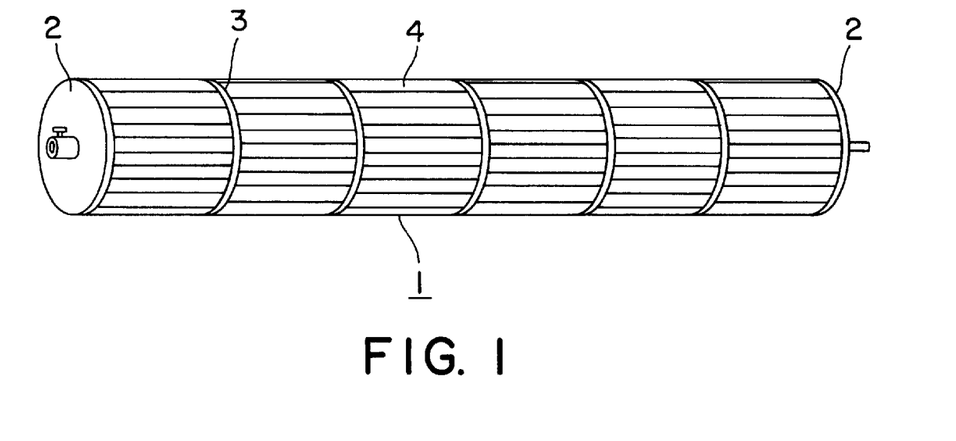
FIG. 1 is a perspective outline view of a cross flow fan in an embodiment of a fan of an air conditioner of the invention.
Figure 2:
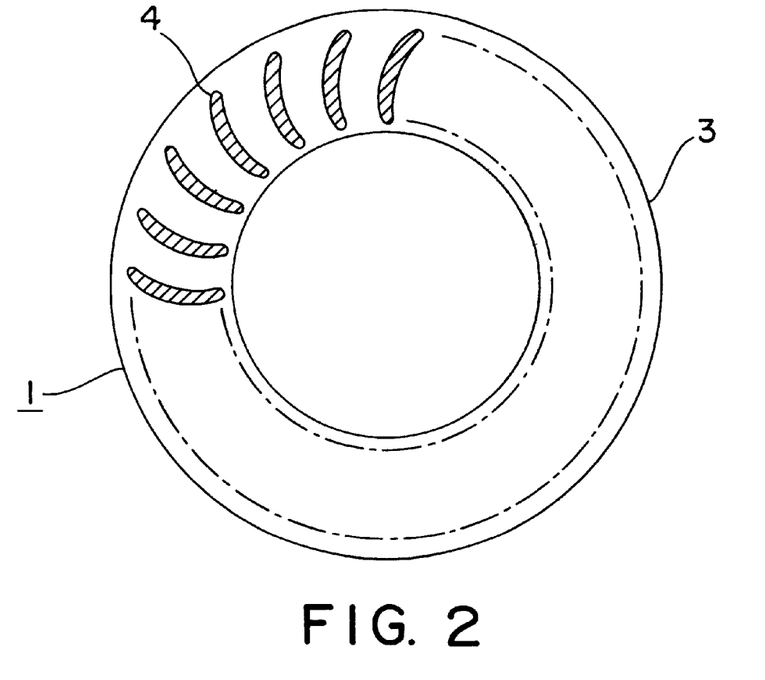
FIG. 2 is a sectional view of the cross flow fan shown in FIG. 1.

A perspective view and a sectional view of a fan used in an air conditioner in an embodiment of the invention are shown in FIG. 1 and FIG. 2.

Figure 3:
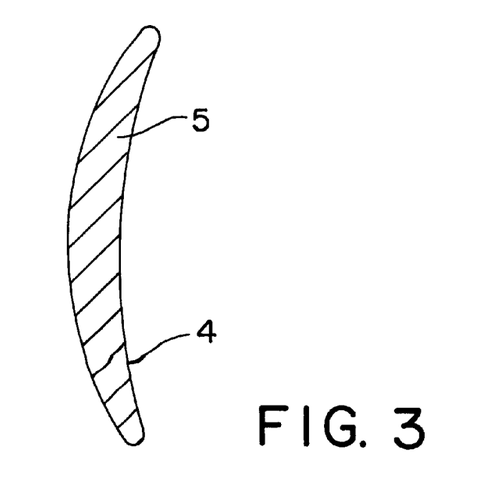
FIG. 3 is a magnified sectional view of blades of the cross flow fan shown in FIG. 2.

In FIG. 1 and FIG. 2, a cross flow fan 1 is a blowing fan has a nearly cylindrical shape, and comprises end plates 2 disposed at both ends, plural partition boards 3 disposed between the both end plates 2, and blades 4 disposed between the end plates 2 and partition boards 3. The blades 4 are bonded to the end plates 2 and partition boards 3 by ultrasonic fusion. The end plates 2, partition boards 3 and blades 4 are composed of compound material containing synthetic resin and glass fiber. Usable synthetic resins include a copolymer produced from acrylonitrile and styrene (hereinafter called AS resin), and heat resisting polystyrene having a higher heat resisting temperature than polystyrene (hereinafter called heat resistant PS resin). A magnified sectional view of the blades 4 is shown in FIG. 3.

In the following description, the glass fiber is abbreviated as GF. The copolymer containing acrylonitrile and styrene is abbreviated as AS resin. The heat resistant polystyrene is abbreviated as heat resistant PS resin. A compound material containing copolymer produced from a monomer containing acrylonitrile and styrene and glass fiber is abbreviated as AS resin compound material. A compound material containing copolymer produced from styrene and heat resistant monomer and glass fiber is abbreviated as PS resin compound material.

Using the compound material containing AS resin and glass fiber, or compound material containing heat resistant PS resin and glass fiber, the end plates 2, partition boards 3 and blades 4 were formed. By ultrasonic fusion of blades 4 to the end plates 2 and partition boards 3, the cross flow fan 1 as shown in FIG. 1 was manufactured. Then, using an annealing oven as shown in FIG. 4, the cross flow fan fused by ultrasonic wave was annealed in specified condition.

Figure 4:
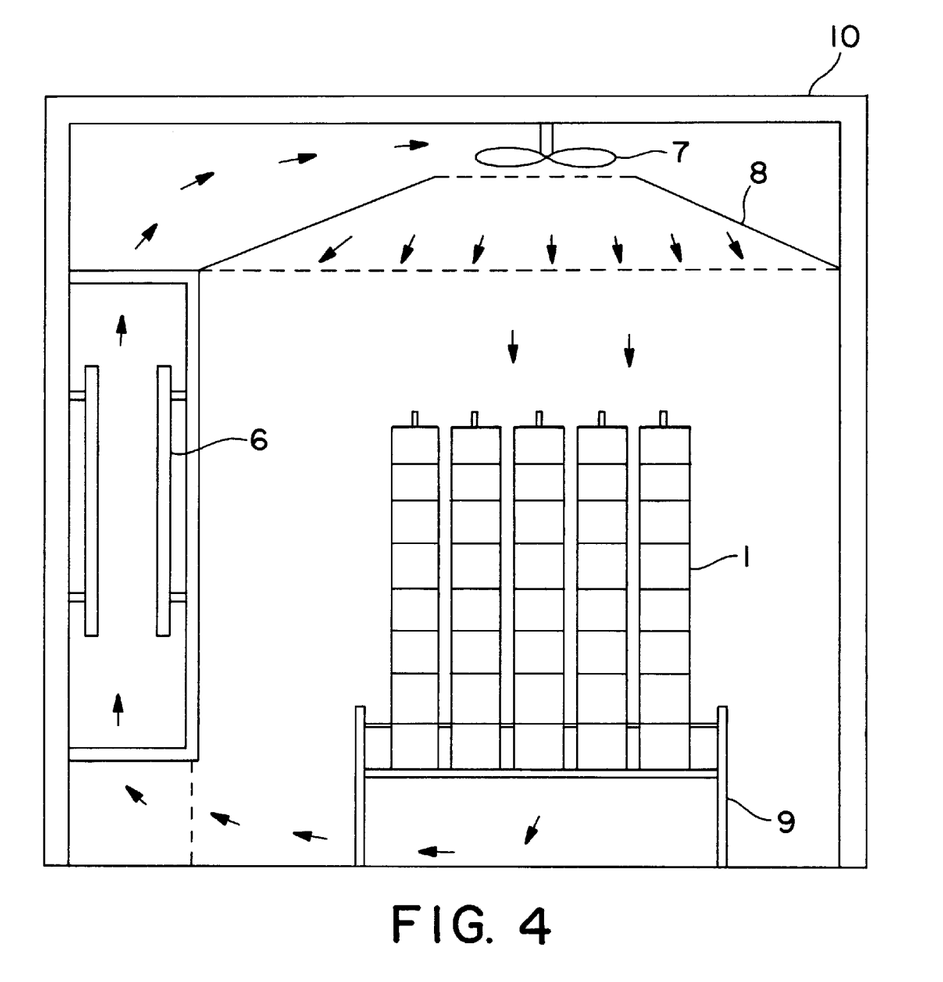
FIG. 4 is a schematic longitudinal sectional view of a hot air circulation annealing oven used in the process of manufacturing the fan of the air conditioner of the invention.

In FIG. 4, an annealing oven 10 comprises a panel heater 6 disposed nearly parallel to the wall, an agitation fan 7 installed above the panel heater 6, and a sample stand 9 placed in the blowing direction of the agitation fan 7. A fan hood 8 is placed between the sample stand 9 and the panel heater 6. The panel heater 6 has two mutually confronting heaters, and hot air enters from the lower side of the two panel heaters 6, passes through the space between the panel heaters 6, moves to the upper side, and the hot air moving to the upper side is agitated by the agitation fan to hit against the fan as the sample placed on the sample stand 9, and further the hot air hitting against the fan enters the space between the two panel heater 6 from the lower side of the two panel heaters 6. In this way, the hot air circulates in the annealing oven 10. The hot air circulated by the agitation fan hits against the fan placed on the sample stand through the fan hood 8. As the fan hood 8 is placed between the sample stand 9 and the panel heater 6, the hot air coming out of the panel heater 6 is prevented from hitting directly against the fan placed on the sample stand. Thus, the temperature of the hot air hitting against the fan as the sample is uniform. The difference between maximum temperature and minimum temperature of the surface of the sample placed on the sample stand 9 is preferred to be within about 5° C. More preferably, this difference should be within about 3° C.

In the cross flow fan obtained by using various compound materials, the necessary annealing time was measured at various wind velocities in a range of 0.5 m/sec to 1 m/sec. The necessary annealing time is the duration necessary for annealing treatment, and was judged in the following method.

In the embodiments and comparative examples, the necessary time for annealing by hot air circulation is the time required until the balance change of the cross flow fan 1 is within 2.0 g·cm or less. The balance change was determined by measuring the imbalance change amount before and after letting stand the cross flow fan 1 in a thermostatic oven at 70° C. for 168 hours in a horizontal position by supporting two points at both ends, by using a balance machine for cross flow fan. When the numerical value of this balance change is large, the balance is impaired, and hence the thermal deformation increases. Accordingly, when used in the air conditioner for a long period, vibration increases and unusual sound or trouble may occur.

The temperature of annealing by hot air circulation is preferred to be lower than the load deflection temperature of the compound material by −5 to −20° C. If annealed at higher temperature, the cross flow fan 1 is thermally deformed. Or when annealed at lower temperature, the annealing effect is small, and a longer annealing time is needed.

General characteristics of various compound materials are shown in Table 2. The required annealing time of the cross flow fan by using various compounds is recorded in Table 1.

TABLE 1

Required annealing time at various wind velocities in cross flow fan

| | Required annealing time by hot air circulation (h) | | | |
|---|---|---|---|---|
| Wind velocity | 1 m/sec | 2 m/sec | 3 m/sec | 0.5 m/sec |
| Embodiment 1 AS resin + GF 30 wt. % | 7 | 6 | 5.5 | 8 |
| Embodiment 2 AS resin + GF 35 wt. % | 6 | 5 | 4.5 | 7 |
| Embodiment 3 AS resin + GF 40 wt. % | 5 | 4.5 | 4 | 6 |
| Embodiment 4 Heat resistant PS resin + GF 30 wt. % | 12 | 9 | 7 | 16 |
| Embodiment 5 Heat resistant PS resin + GF 35 wt. % | 10 | 8 | 6 | 12 |
| Embodiment 6 Heat resistant PS resin + GF 40 wt. % | 9 | 7 | 5 | 10 |
| Prior art AS resin + GF 30 wt. % (conventional annealing oven) | 7.5 Longer time required in fan installed in low temperature area due to occurrence of temperature difference. Slight deformation by effect of fast wind velocity observed in fan installed in high temperature area due to occurrence of temperature difference. | 6.5 Longer time required in fan installed in low temperature area due to occurrence of temperature difference. Slight deformation by effect of fast wind velocity observed in fan installed in high temperature area due to occurrence of temperature difference. | 6 Longer time required in fan installed in low temperature area due to occurrence of temperature difference. Slight deformation by effect of fast wind velocity observed in fan installed in high temperature area due to occurrence of temperature difference. | 8 |

TABLE 2.1

| Item | Test method (unit) | Embodiment 1 AS resin + GF 30 wt. % | Embodiment 2 AS resin + GF 35 wt. % | Embodiment 3 AS resin + GF 40 wt. % |
|---|---|---|---|---|
| Tensile strength | JIS-K-7113 (kgf/cm$^2$) | 1285 | 1340 | 1450 |
| Izod impact strength | JIS-K-7110 (kgf · cm/cm) | | | |
| (with notch) | | 4.1 | 5.1 | 6.2 |
| (without notch) | | 22.7 | 24.4 | 26.8 |
| Bending strength | JIS-K-7203 (kgf/cm$^2$) | 1440 | 1500 | 1550 |
| Bending elasticity | | 84300 | 95000 | 108000 |
| Vicat softening point | JIS-K-7206 Load 1 kgf(° C.) | 120 | 122 | 124 |
| Load deflection temperature | JIS-K-7207 Load18.5kgf/ cm$^2$(° C.) | 105 | 108 | 110 |
| Flowability | g/10 min | 4 | 3.5 | 3 |
| Density | | 1.29 | 1.30 | 1.34 |

TABLE 2.2

| Item | Embodiment 4<br>Heat resistant PS resin + GF<br>30 wt. % | Embodiment 5<br>Heat resistant PS resin + GF<br>35 wt. % | Embodiment 6<br>Heat resistant PS resin + GF<br>40 wt. % | Prior art<br>As + GF 30 wt. % |
|---|---|---|---|---|
| Tensile strength | 1070 | 1060 | 1115 | 1285 |
| Izod impact strength | | | | |
| (with notch) | 5.2 | 6.4 | 6.8 | 4.1 |
| (without notch) | 19.2 | 23.3 | 24.0 | 22.7 |
| Bending strength | 1200 | 1250 | 1350 | 1440 |
| Bending elasticity | 71800 | 76000 | 82000 | 84300 |
| Vicat softening point | 122 | 124 | 126 | 120 |
| Load deflection temperature | 107 | 110 | 112 | 105 |
| Flowability | 10 | 9 | 8 | 4 |
| Density | 1.25 | 1.284 | 1.34 | 1.29 |

Embodiments 1 to 6 are described below while referring to the tables.

Exemplary embodiment 1

The compound material in embodiment 1 contains AS resin and 30 wt. % of glass fiber. Using this compound material, a cross flow fan of embodiment 1 was manufactured. The cross flow fan 1 was set on a fan stand nearly in the center of a hot air circulation annealing oven 10. The temperature around the cross flow fan, that is, the resin temperature was uniformly adjusted at 90 to 95° C., and after letting stand for a specific time, the air sucked in from the lower part was uniformly heated by a heater unit 6 comprising a panel heater, and the oven air was agitated by an agitation fan 7 in the ceiling, and the oven temperature is more uniform. The arrow in the diagram shows the flow direction of hot air, and the wind velocity of hot air can be freely set in a range of 1 to 3 m/sec by controlling the rotating speed of the motor of the agitation fan 7. The oven temperature is further made uniform as the hot air flows uniformly from upper to lower direction by a fan hood 8. Therefore, the temperature difference between upper part and lower part of the fan surface is within 2° C., and uniform annealing treatment is realized. As the heater used in the heater unit 6, the panel heater is more preferable than the bar heater because the panel heater is installed at one side of the oven and heats the circulating air widely and uniformly.

When the cross flow fan using the compound material in embodiment 1 is annealed by circulation of hot air at 90 to 95° C. at wind velocity of 1 to 3 m/sec, the required annealing time is 7 hours at wind velocity of 1 m/sec, the required annealing time is 6 hours at wind velocity of 2 m/sec, and the required annealing time is 5.5 hours at wind velocity of 3 m/sec. By contrast, in the prior art, the required annealing time is 8 hours at wind velocity of 0.5 m/sec. By the annealing method of the embodiment by hot air circulation at wind velocity of 1 to 3 m/sec, the required annealing time is shorter than in the conventional annealing method by hot air circulation at wind velocity of 0.5 m/sec.

Exemplary embodiments 2 and 3

The compound material in embodiment 2 contains AS resin and 35 wt. % of glass fiber. The compound material in embodiment 3 contains AS resin and 40 wt. % of glass fiber.

Using these compound materials, cross flow fans were manufactured, and annealed same as in embodiment 1 by hot air circulation at 90 to 95° C. and wind velocity of 1 to 3 m/sec. The compound material of embodiment 2 is higher in rigidity than in embodiment 1. That is, the bending strength of embodiment 1 is 1,440 kgf/cm$^2$, and the bending strength of embodiment 2 is 1,500 kgf/cm$^2$. The bending elasticity (elastic modulus) of embodiment 1 is 84,300 kgf/cm$^2$, and the bending elasticity (elastic modulus) of embodiment 2 is 95,000 kgf/cm$^2$. The load deflection temperature of embodiment 1 is 105° C., and the load deflection temperature of embodiment 2 is 108° C. Corresponding to the heat resistance, embodiment 2 presents a higher resistance to heat and creep than embodiment 1. The required annealing time is 6 hours at wind velocity of 1 m/sec, the required annealing time is 5 hours at wind velocity of 2 m/sec, and the required annealing time is 4.5 hours at wind velocity of 3 m/sec.

The bending strength of the compound material of embodiment 3 is 1,550 kgf/cm$^2$, and the bending elasticity (elastic modulus) is 108,000 kgf/cm$^2$. That is, embodiment 3 has a stronger rigidity than the compound material of embodiment 2. The required annealing time is 5 hours at wind velocity of 1 m/sec, the required annealing time is 4.5 hours at wind velocity of 2 m/sec, and the required annealing time is 4 hours at wind velocity of 3 m/sec. Thus, the compound material in embodiment 3 is annealed in a much shorter time than in embodiment 2. However, the wind velocity of 4 m/sec or more is not preferred because the compound material is likely to be deformed thermally.

Exemplary embodiment 4

The compound material in embodiment 4 contains heat resistant PS resin and 30 wt. % of glass fiber. The glass fiber is mixed in the heat resistant PS resin when manufacturing the compound material. The heat resistant PS resin is a copolymer of styrene and heat resistant monomer, and the heat resistant monomer is maleic monomer, N-phenyl maleimide monomer, methacrylic monomer, or monomer capable of forming syndiotactic polystyrene (SPS). The heat resistant PS resin may be also a resin containing polystyrene of syndiotactic structure having a higher heat resisting temperature than polystyrene. This heat resistant PS resin has a higher heat resisting temperature than an ordinary polystyrene. The load deflection temperature of the compound material of embodiment 4 is about 107° C. By contrast, the load deflection temperature of the conventional compound material containing conventional polystyrene (PS) and 30 wt. % of glass fiber is about 95° C. That is, the load deflection temperature of the heat resistant PS resin compound material in embodiment 4 is about 12° C. higher than that of the conventional polystyrene compound material.

The cross flow fan 1 of embodiment 4 was annealed at annealing temperature of 95 to 100° C. The load deflection temperature of the AS compound material of the prior art is 105° C. Therefore, the load deflection temperature of the heat resistant PS resin compound material in embodiment 4 is slightly higher than that of the conventional AS compound material. Accordingly, the set temperature of annealing of the conventional AS compound material is 90 to 95° C., which is slightly lower than in embodiment 4 to embodiment 6. The other method is same as in embodiment 1 to embodiment 3.

As the heater unit 6, the panel heater is preferred same as in embodiment 1 to embodiment 3. The other conditions including hot air agitation are same as in embodiment 1 to embodiment 3, and the annealing effect is exhibited more smoothly in this method.

The compound material of heat resistant PS resin and 30 wt. % of glass fiber mixed as reinforcing material is higher in flowability than the compound material of AS resin and 30 wt. % of glass fiber in the prior art. That is, the melt flow rate of the heat resistant PS resin compound material of embodiment 4 is 10, and the melt flow rate of the AS compound material of the prior art is 4. At temperature of 220° C. and load of 10 kgf, the melt flow rate of the heat resistant PS resin compound material of embodiment 4 is about 2.5 times that of the AS compound material of the prior art, and its yield is hence higher and the productivity is excellent.

For molding the parts, a four-piece die was used in the molding machine, and the heating temperature of the compound material in the molding machine was set at about 250° C.

Since the cross flow fan using the compound material of the embodiment is annealed by hot air circulation at wind velocity of 1 to 3 m/sec, it is annealed in a shorter time than in the prior art of annealing by hot air circulation at wind velocity of 0.5 m/sec or less. By hot air circulation in embodiment 4, the annealing time is 12 hours at wind velocity of 1 m/sec, 9 hours at wind velocity of 2 m/sec, and 7 hours at wind velocity of 3 m/sec. In the prior art of annealing by hot air circulation at wind velocity of 0.5 m/sec, the required time is 16 hours.

Exemplary embodiments 5 and 6

The compound material in embodiment 5 contains heat resistant PS resin and 35 wt. % of glass fiber. The compound material in embodiment 6 contains heat resistant PS resin and 40 wt. % of glass fiber. Cross flow fans using these compound materials were annealed by hot air circulation at 95 to 100° C. and wind velocity of 1 to 3 m/sec. The compound material of embodiment 5 is higher in rigidity than in embodiment 4. That is, the bending strength of embodiment 4 is 1,200 kgf/cm$^2$, and the bending strength of embodiment 5 is 1,250 kgf/cm$^2$, and the bending elasticity of embodiment 4 is 71,800 kgf/cm$^2$, and the bending elasticity of embodiment 5 is 76,000 kgf/cm$^2$. These compound materials are high in heat resistance. That is, the load deflection temperature of the compound material of embodiment 4 is 107° C., and the load deflection temperature of embodiment 5 is 110° C. The resistance to heat and creep of the compound material of embodiment 5 is superior to that of the conventional AS compound material. Accordingly, the required annealing time by hot air circulation of the compound material of embodiment 5 is 10 hours at wind velocity of 1 m/sec, 8 hours at wind velocity of 2 m/sec, and 6 hours at wind velocity of 3 m/sec. Thus, the required annealing time for the cross flow fan of embodiment 5 is short. At the same time, the productivity is superior.

The bending strength of the compound material of embodiment 6 is 1,350 kgf/cm$^2$, and the bending elasticity is 82,000 kgf/cm$^2$. It has a stronger rigidity than the compound material of embodiment 5. The required annealing time by hot air circulation of the cross flow fan of embodiment 6 is 9 hours at wind velocity of 1 m/sec, 7 hours at wind velocity of 2 m/sec and 5 hours at wind velocity of 3 m/sec. Thus, the required annealing time for the cross flow fan of embodiment 6 is shortened.

As mentioned above, the annealing temperature by hot air circulation is preferred to be in a temperature range of about 5° C. to about 20° C. lower than the load deflection temperature of the compound material being used. At higher temperature, the cross flow fan 1 is likely to deform thermally. At lower temperature, the annealing effect is smaller, and it takes a longer time in annealing. Table 3 shows the required annealing time at various temperatures by annealing by circulating hot air at wind velocity of 2 m/sec.

TABLE 3

Required annealing time at various temperatures by hot air circulation (h), wind velocity 2 m/sec

|  | 80 ~ 85 (° C.) | 85 ~ 90 (° C.) | 90 ~ 95 (° C.) | 95 ~ 100 (° C.) | 100 ~ 105 (° C.) |
|---|---|---|---|---|---|
| Embodiment 1 AS resin + GF 30 wt. % | 7 | 6 | 6 | 5 | Slight deformation observed in fan. |
| Embodiment 2 AS resin + GF 35 wt. % | 7 | 6 | 5 | 4 | Slight deformation observed in fan. |
| Embodiment 3 AS resin + GF 40 wt. % | 6 | 5 | 4.5 | 3.5 | Slight deformation observed in fan. |
| Embodiment 4 Heat resistant PS resin + GF 30 wt. % | 30 | 14 | 10 | 9 | 8 |
| Embodiment 5 Heat resistant PS resin + GF 25 wt. % | 16 | 12 | 9 | 8 | 7 |
| Embodiment 6 Heat resistant PS resin + GF 40 wt. % | 12 | 9 | 8 | 7 | 6 |

The following may be known from Table 3.

The required annealing time for the cross flow fan using the compound material of embodiment 1 is 7 hours at 80 to 85° C., 6 hours at 85 to 90° C., 6 hours at 90 to 95° C., and 5 hours at 95 to 100° C. When the annealing temperature is 100 to 105° C., the thermal deformation of the cross flow fan is significant, and it is not usable practically. As the annealing temperature is raised, the annealing treatment time can be shortened, but the cross flow fan is likely to deform thermally. Therefore, from the viewpoint of temperature control, the annealing temperature in annealing treatment is most preferable in a temperature range of about 10° C. to about 15° C. lower than the load deflection temperature.

In the embodiment, the cross flow fan is used as the blowing fan, but not limited to the cross flow fan, sirocco fan, propeller fan and others may be used, and the same effects can be obtained.

As the air conditioner of the invention, the cooler for cooling operation is shown, but it may be similarly applied to a hot air fan for hot air heating operation, heating machine, or cooling/heating machine.

As clear from the embodiments, in the constitution of the invention, annealing treatment can be done securely in a shorter time than in the conventional annealing treatment by hot air circulation at wind velocity of 0.5 m/sec or less, and hence the productivity is enhanced. During long period of use of the air conditioner, moreover, thermal deformation of the fan can be prevented. As compared with the conventional fan, the flowability when molding is improved, and short shots are less likely to occur in the end plates, partition boards and blades when molding, and two to four multiple pieces can be taken when molding, and the yield is higher. Moreover, in annealing treatment by hot air circulation, the fan can be heated uniformly by heating by the panel heater installed at the oven side, and uniform flow of heating air from the upper to lower part direction from the agitation fan provided in the ceiling of the oven and the panel heater by the fan hood. As a result, annealing treatment is done securely in a short time. When the panel heater is installed parallel to the flow direction of the circulation air, the flow of hot air is stable and efficient heating is possible.

What is claimed is:

1. An air conditioner comprising:
   (a) at least one heat control means of heating means and cooling means for conditioning an air temperature, and
   (b) a fan for blowing air controlled by said heat control means,
   wherein said fan includes a molded part molded of a compound material, said compound material having:
      (i) glass fiber, and
      (ii) at least one copolymer of a copolymer produced from a monomer containing acrylonitrile and styrene, and a copolymer produced from styrene and a heat resistant monomer,
   wherein said molded part has a load deflection temperature of about 100° C. or more by a testing method of JIS K 7207 at a load of 18.5 kgf/cm$^2$, and
   said fan is cleared of strain by annealing treatment by hot air circulation in a temperature range lower by about 5° C. to about 20° C. than said load deflection temperature, and in a wind velocity range of about 1 m/sec to about 3 m/sec.

2. An air conditioner of claim 1, wherein said compound material comprises 50 wt. % to 80 wt. % of said copolymer, and 20 wt. % to 50 wt. % of glass fiber dispersed in said copolymer.

3. An air conditioner of claim 1, wherein said fan includes end plates disposed at both ends, a partition board placed between said end plates, and
   a plurality of blades having weld zones fused to at least one of said end plates and said partition board, and
   strain of said weld zones is removed.

4. An air conditioner of claim 1, wherein said fan has a nearly cylindrical appearance,
   at least one of said end plates and said partition board has a disk shape, and is rotatable about the axis linking with the center of said disk shape, and wind is generated by the rotation about said axis and action of said blades.

5. An air conditioner of claim 1, wherein when said fan is treated by said annealing, the difference between maximum temperature and minimum temperature of surface temperature of said fan is within about 5° C.

6. An air conditioner comprising:
   (a) at least one heat control means of heating means and cooling means for conditioning an air temperature, and
   (b) a fan for blowing air controlled by said heat control means,
   wherein said fan includes a molded part molded of a first compound material having 50 wt. % to 80 wt. % of a copolymer produced from a monomer containing acrylonitrile and styrene, and 20 wt. % to 50 wt. % of glass fiber dispersed in said copolymer, and
   said fan is cleared of strain by annealing treatment by hot air circulation in a temperature range of about 80° C. to about 100° C., and in a wind velocity range of about 1 m/sec to about 3 m/sec.

7. An air conditioner of claim 6, wherein said molded part has a load deflection temperature of about 100° C. or more by a testing method of JIS K 7207 at a load of 18.5 kgf/cm$^2$.

8. An air conditioner of claim 6, wherein said fan includes end plates disposed at both ends, a partition board placed between said end plates, and a plurality of blades having weld zones fused to at least one of said end plates and partition board, and strain of said weld zones is removed.

9. An air conditioner of claim 6, wherein said fan has a nearly cylindrical appearance,
   at least one of said end plates and said partition board has a disk shape, and
   said fan may rotate about the axis linking with the center of said disk shape, and wind is generated by the rotation about said axis and action of said blades.

10. An air conditioner of claim 6, wherein when said fan is treated by said annealing, the difference between maximum temperature and minimum temperature of surface temperature of said fan is within about 5° C.

11. An air conditioner comprising:
    (a) at least one heat control means of heating means and cooling means for conditioning an air temperature, and
    (b) a fan for blowing air controlled by said heat control means,
    wherein said fan includes a molded part molded of a first compound material having 50 wt. % to 80 wt. % of a copolymer produced from styrene and heat resistant monomer, and 20 wt. % to 50 wt. % of glass fiber dispersed in said copolymer, and
    said fan is cleared of strain by annealing treatment by hot air circulation in a temperature range of about 80° C. to about 105° C., and in a wind velocity range of about 1 m/sec to about 3 m/sec.

12. An air conditioner of claim 11, wherein said molded part has a load deflection temperature of about 105° C. or more by a testing method of JIS K 7207 at a load of 18.5 kgf/cm$^2$.

13. An air conditioner of claim 11, wherein said fan includes end plates disposed at both ends, a partition board placed between said end plates, and a plurality of blades having weld zones fused to at least one of said end plates and partition board, and strain of said weld zones is removed.

14. An air conditioner of claim 11, wherein said fan has a nearly cylindrical appearance,
    at least one of said end plates and said partition board has a disk shape, and
    said fan may rotate about the axis linking with the center of said disk shape, and wind is generated by the rotation about said axis and action of said blades.

15. An air conditioner of claim 11, wherein said heat resistant monomer is at least one monomer selected from the group consisting of monomer containing maleic group, monomer containing N-phenyl maleimide group, and monomer containing methacrylic group.

16. An air conditioner of claim 11, wherein said copolymer contains polystyrene having a syndiotactic structure.

17. An air conditioner of claim 11, wherein when said fan is treated by said annealing, the difference between maximum temperature and minimum temperature of surface temperature of said fan is within about 5° C.

18. A manufacturing method of an air conditioner comprising the steps of:
    (a) supplying at least one heat control means of heating means and cooling means for conditioning an air temperature, and
    (b) manufacturing a fan for blowing air controlled by said heat control means,
    wherein said step of manufacturing the fan includes the steps of:
    (1) preparing a compound material having
       (i) glass fiber, and
       (ii) at least one copolymer of a copolymer produced from a monomer containing acrylonitrile and styrene, and a copolymer produced from styrene and a heat resistant monomer, (2) forming a molded part by molding said compound material, (3) assembling a fan by using said molded part, said fan having a load deflection temperature of about 100° C. or more by a testing method of JIS K 7207 at a load of 18.5 kgf/cm$^2$, and (4) clearing said molded part of strain by annealing the fan by hot air circulation in a temperature range lower by about 5° C. to about 20° C. than said load deflection temperature, and in a wind velocity range of about 1 m/sec to about 3 m/sec.

19. A manufacturing method of an air conditioner of claim 18, wherein said step (3) of assembling a fan is a step of assembling said fan having weld zone by heating and fusing said molded part, and said step (4) of clearing of strain is a step of removing strain from said weld zone.

20. A manufacturing method of an air conditioner of claim 18, wherein said step of preparing said compound material is a step of mixing 50 wt. % to 80 wt. % of said copolymer, and 20 wt. % to 50 wt. % of glass fiber dispersed in said copolymer.

21. A manufacturing method of an air conditioner of claim 18, wherein said step of assembling a fan includes a step of assembling end plates disposed at both ends, a partition board placed between said end plates, and plural blades having weld zones fused to at least one of said end plates and partition board.

22. A manufacturing method of an air conditioner of claim 18, wherein said fan has a nearly cylindrical appearance, at least one of said end plates and said partition board has a disk shape, and said fan may rotate about the axis linking with the center of said disk shape, and wind is generated by the rotation about said axis and action of said blades.

23. A manufacturing method of an air conditioner of claim 18, wherein at said step (4), when said fan is treated by said annealing, the difference between maximum temperature and minimum temperature of surface temperature of said fan is within about 5° C.

24. A manufacturing method of an air conditioner of claim 18, wherein said step of annealing includes the steps of:

(c) supplying an annealing oven for circulating hot air, comprising a panel heater installed nearly parallel to a side wall, an agitation fan installed above said panel heater, and a sample stand placed in the blowing direction of said agitation fan, and (d) clearing said fan of strain by blowing hot air to said fan uniformly by placing said fan on said sample stand.

25. A manufacturing method of an air conditioner of claim 24, wherein said panel heater has two mutually confronting panel heaters, said hot air enters from the lower side of said two panel heaters, and moves to the upper side through the space between said two panel heaters, said hot air moving to the upper side is agitated by said agitation fan to hit against said fan placed on said sample stand, and said hot air hitting against said fan enters between said two panel heaters from the lower side of said two panel heaters.

26. A manufacturing method of an air conditioner of claim 24, wherein said annealing oven has a fan hood for separating said sample stand and said panel heaters, and said hot air circulated by said agitation fan hits against said fan through said fan hood.

27. A manufacturing method of an air conditioner of claim 24, wherein when said fan is treated by said annealing, the difference between maximum temperature and minimum temperature of surface temperature of said fan is within about 5° C.

28. A manufacturing method of an air conditioner comprising the steps of:

(a) supplying at least one heat control means of heating means and cooling means for conditioning an air temperature, and (b) manufacturing a fan for blowing air controlled by said heat control means, wherein said step of manufacturing a fan includes the steps of:

(1) preparing a compound material having
   (i) 50 wt. % to 80 wt. % of a copolymer produced from a monomer containing acrylonitrile and styrene, and
   (ii) 20 wt. % to 50 wt. % of glass fiber dispersed in said copolymer, (2) forming said compound material for producing a molded part, (3) heating and fusing said molded part for assembling a fan having weld zone, and (4) clearing said weld zone of strain by annealing said fan by hot air circulation in a temperature range of about 80° C. to about 100° C., and in a wind velocity range of about 1 m/sec to about 3 m/sec.

29. A manufacturing method of an air conditioner of claim 28, wherein said molded part has a load deflection temperature of about 100° C. or more by a testing method of JIS K 7207 at a load of 18.5 kgf/cm$^2$, and when said fan is treated by said annealing, the difference between maximum temperature and minimum temperature of surface temperature of said fan is within about 5° C.

30. A manufacturing method of an air conditioner comprising the steps of:

(a) supplying at least one heat control means of heating means and cooling means for conditioning an air temperature, and (b) manufacturing a fan for blowing air controlled by said heat control means, wherein said step of manufacturing a fan includes the steps of:

(1) preparing a compound material having
   (i) 50 wt. % to 80 wt. % of a copolymer produced from styrene and heat resistant monomer, and
   (ii) 20 wt. % to 50 wt. % of glass fiber dispersed in said copolymer, (2) forming said compound material for producing a molded part, (3) heating and fusing said molded part for assembling a fan having weld zone, and (4) clearing said weld zone of strain by annealing said fan by hot air circulation in a temperature range of about 80° C. to about 105° C., and in a wind velocity range of about 1 m/sec to about 3 m/sec.

31. A manufacturing method of an air conditioner of claim 30, wherein said molded part has a load deflection temperature of about 105° C. or more by a testing method of JIS K 7207 at a load of 18.5 kgf/cm$^2$, and when said fan is treated by said annealing, the difference between maximum temperature and minimum temperature of surface temperature of said fan is within about 5° C.

32. A manufacturing method of an air conditioner comprising the steps of:
   (a) supplying at least one heat control means of heating means and cooling means for conditioning an air temperature, and
   (b) manufacturing a fan for blowing air controlled by said heat control means,
   wherein said step of manufacturing a fan includes the steps of:
   (1) molding a polymer for producing a plurality of molded parts,
   (2) heating and fusing each molded part of said plurality of molded parts for assembling a fan having weld zone, and
   (4) annealing said fan by hot air circulation to clear said weld zone of strain, and
   wherein said step of annealing includes the steps of:
   (c) supplying an annealing oven for circulating hot air, comprising a panel heater installed nearly parallel to a side wall, an agitation fan installed above said panel heater, and a sample stand placed in the blowing direction of said agitation fan, and
   (d) clearing said fan of strain by blowing hot air to said fan uniformly by placing said fan on said sample stand.

33. A manufacturing method of an air conditioner of claim 32, wherein said panel heater has two mutually confronting panel heaters,
   said hot air enters from the lower side of said two panel heaters, and moves to the upper side through the space between said two panel heaters,
   said hot air moving to the upper side is agitated by said agitation fan to hit against said fan placed on said sample stand, and
   said hot air hitting against said fan enters between said two panel heaters from the lower side of said two panel heaters.

34. A manufacturing method of an air conditioner of claim 32, wherein said annealing oven has a fan hood for separating said sample stand and said panel heaters, and said hot air circulated by said agitation fan hits against said fan through said fan hood.

35. A manufacturing method of an air conditioner of claim 32, wherein when said fan is treated by said annealing, the difference between maximum temperature and minimum temperature of surface temperature of said fan is within about 5° C.

* * * * *